(12) United States Patent
Ishikawa et al.

(10) Patent No.: US 12,214,504 B2
(45) Date of Patent: Feb. 4, 2025

(54) LAYOUT GENERATION DEVICE, LAYOUT GENERATION METHOD, AND LAYOUT GENERATION PROGRAM

(71) Applicant: DENSO CORPORATION, Kariya (JP)

(72) Inventors: Shota Ishikawa, Kariya (JP); Tomoaki Ozaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 202 days.

(21) Appl. No.: 17/645,009

(22) Filed: Dec. 17, 2021

(65) Prior Publication Data

US 2022/0193909 A1    Jun. 23, 2022

(30) Foreign Application Priority Data

Dec. 22, 2020   (JP) ................................. 2020-212681

(51) Int. Cl.
    *B25J 9/16*           (2006.01)
(52) U.S. Cl.
    CPC .................................. *B25J 9/1666* (2013.01)
(58) Field of Classification Search
    CPC ...... B25J 9/1666; B25J 9/1664; B25J 9/1651; G05B 2219/40477; G01C 21/3492
    See application file for complete search history.

(56) References Cited

U.S. PATENT DOCUMENTS

| | | |
|---|---|---|
| 2005/0004709 A1 | 1/2005 | Watanabe et al. |
| 2018/0036882 A1 | 2/2018 | Kimura |
| 2018/0236657 A1* | 8/2018 | Kuwahara ............... B25J 9/1671 |
| 2019/0240833 A1* | 8/2019 | Kimura .................. B25J 9/1664 |
| 2020/0009724 A1 | 1/2020 | Inoue |
| 2021/0252707 A1* | 8/2021 | Wang ..................... B25J 9/1666 |
| 2022/0035375 A1* | 2/2022 | Rezaee .................... G06N 3/08 |

* cited by examiner

*Primary Examiner* — Khoi H Tran
*Assistant Examiner* — Christopher Scott
(74) *Attorney, Agent, or Firm* — MASCHOFF BRENNAN

(57) ABSTRACT

A layout generation device includes: a waypoint registration unit, an arrangement generation unit, an arrangement evaluation unit, an arrangement extraction unit, a path determination unit, a path generation unit, an arrangement exclusion unit, and an arrangement evaluation update unit. The arrangement evaluation unit evaluates, as an evaluation value, an operation time of a robot without considering an obstacle for each of arrangements. The arrangement extraction unit extracts an arrangement having a best evaluation value from among the evaluated arrangements by the arrangement evaluation unit. The path determination unit determines whether or not an extracted arrangement extracted by the arrangement extraction unit needs to avoid an obstacle in terms of an operation of the robot via a waypoint.

18 Claims, 9 Drawing Sheets

LAYOUT GENERATION DEVICE, LAYOUT GENERATION METHOD, AND LAYOUT GENERATION PROGRAM

REFERENCE TO RELATED APPLICATION

The present application is based on and claims the benefit of priority of Japanese Patent Application No. 2020-212681, filed on Dec. 22, 2020, the disclosure of which is incorporated herein by reference.

TECHNICAL FIELD

The present disclosure generally relates to a layout generation device, a layout generation method and a layout generation program.

BACKGROUND

Conventionally, it is necessary for the user to select an arrangement pattern, and there is room for improvement in determining an arrangement in which an operation time of the robot is short.

SUMMARY

It is an object of the present disclosure to provide a layout generation device, a layout generation method, and a layout generation program that enable an efficient arrangement search with a short robot operation time.

The disclosed aspects in this specification adopt different technical solutions from each other in order to achieve their respective objectives.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
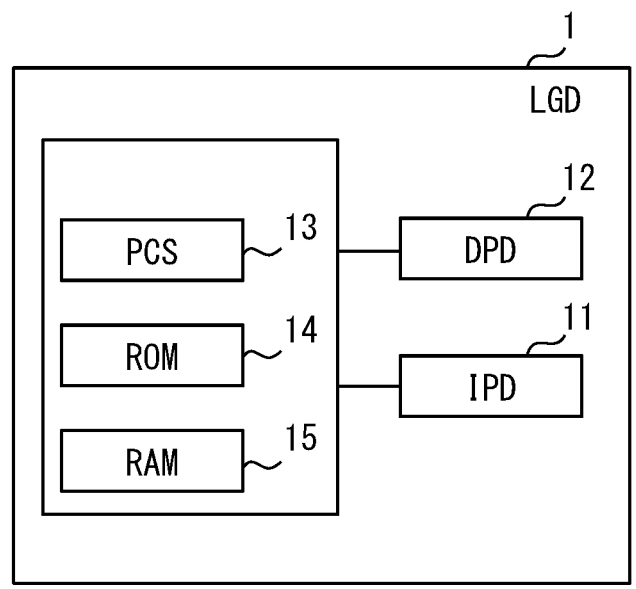
FIG. 1 is a configuration diagram of a layout generation device according to a first embodiment.

The following will describe embodiments for carrying out the present disclosure with reference to the drawings. In each embodiment, portions corresponding to the elements described in the preceding embodiments are denoted by the same reference numerals, and redundant explanation may be omitted. When only a part of a configuration is described in an embodiment, another preceding embodiment may be applied to the other parts of the configuration. It may be possible not only to combine parts the combination of which is explicitly described in an embodiment, but also to combine parts of respective embodiments the combination of which is not explicitly described if any obstacle does not especially occur in combining the parts of the respective embodiments.

First Embodiment, FIGS. 1-4

The first embodiment is described with reference to FIGS. 1 to 4. FIG. 1 is a configuration diagram of a layout generation device 1 of the first embodiment. The layout generation device 1 is, for example, a device that generates a layout having a high evaluation value including an operation time of a robot 2 with respect to the robot 2 and surrounding obstacle(s) shown in FIG. 2. The layout includes an arrangement of the robot 2 and the obstacle(s) in a same virtual space in consideration of the time change of the position and posture of the robot 2.

Figure 2:
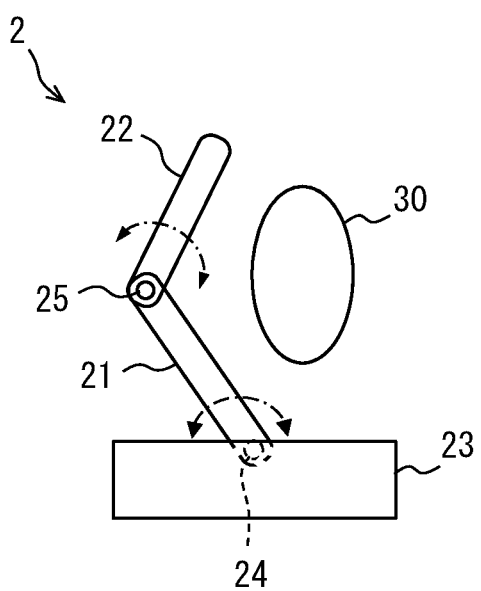
FIG. 2 is a diagram illustrating a configuration of a robot.

The robot 2 shown in FIG. 2 includes two shafts, that is, a first shaft 21 and a second shaft 22, and two joints, that is, a first joint 24 and a second joint 25. The robot 2 has a simplified configuration for explaining an embodiment. The number of shafts and the number of joints may be three or more.

The first joint 24 is provided at one end of the first shaft 21 and makes the first shaft 21 rotatable around a rotation shaft orthogonal to the first shaft 21. The first shaft 21 is connected to a base 23 by the first joint 24 to be rotatable relative to the base 23. The base 23 is installed on a floor or an installation base.

The second joint 25 is provided at the other end of the first shaft 21, i.e., on the other side where the first joint 24 is not provided. The second joint 25 connects an end of the first shaft 21 and an end of the second shaft 22, and has the second shaft 22 relatively rotatable with respect to the first shaft 21 around a rotation shaft orthogonal to both of the first shaft 21 and the second shaft 22. In FIG. 2, the shapes of the first shaft 21 and the second shaft 22 are rod-shaped. However, the shapes of the first shaft 21 and the second shaft 22 do not have to be rod-shaped, and can be variously changed according to the application of the robot 2.

A range of an angle in which the first shaft 21 can rotate relative to the base 23 and a range of an angle in which the second shaft 22 can rotate relative to the first shaft 21 vary depending on a mechanical structure or an electrical configuration.

An obstacle 30 is also shown in FIG. 2. The obstacle 30 is an object that becomes an obstacle when the first shaft 21 or the second shaft 22 moves, and the shape and position thereof differ depending on the position where the robot 2 is installed.

The layout generation device (LGD) 1 includes an input device (IPD) 11, a display device (DPD) 12, a processor (PCS) 13, a ROM 14, and a RAM 15. The layout generation device 1 having such a configuration can also be realized by a general-purpose computer.

The input device 11 is a keyboard or the like, and can be used to input a structure of the robot 2, a position of the obstacle 30, an operation path start point, an operation path end point, and the like. The structure of the robot 2 includes a length and width of the first shaft 21 and the second shaft 22, a position of the first joint 24, a relative position of the second joint 25 with respect to the first shaft 21 and the second shaft 22, and the like. A position of the obstacle 30 specifies a space in which the obstacle 30 exists by the coordinates. The display device 12 can display a layout related to the robot 2 and surrounding obstacle(s) generated by the layout generation device 1.

A layout generation program executed by the processor 13 is stored in the ROM 14 which is a non-volatile storage medium. The processor 13 may execute the layout generation program stored in the ROM 14 while using a temporary storage function of the RAM 15, and the processor 13 executes each component (e.g., a process) shown in FIG. 3. Execution of each component shown in FIG. 3 by the processor 13, means that a layout generation method corresponding to the layout generation program is executed.

Figure 3:
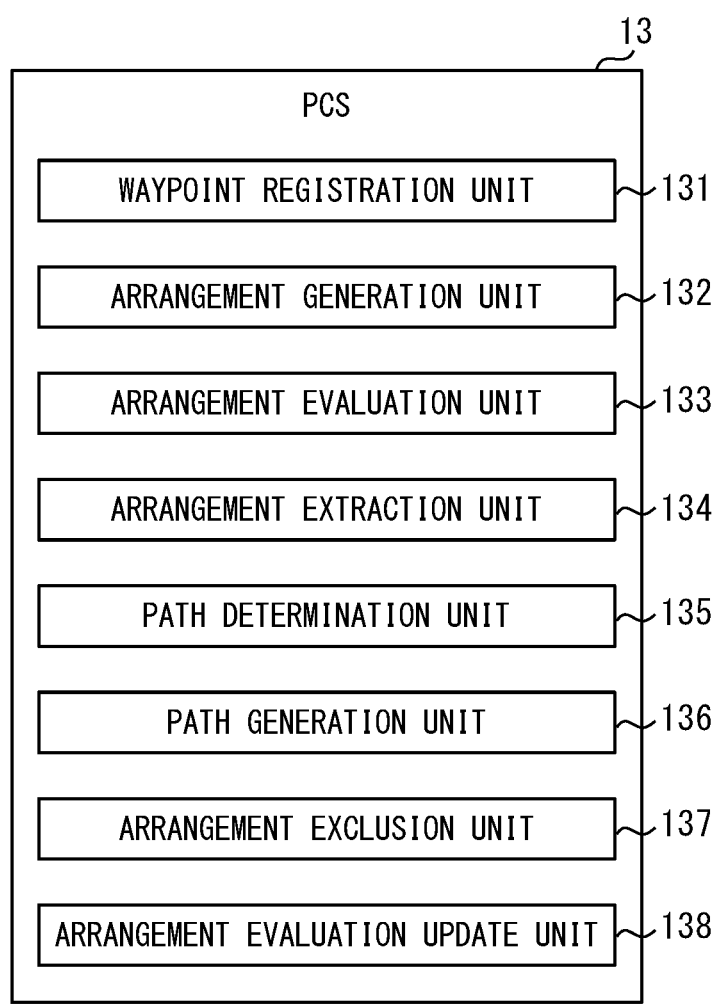
FIG. 3 is a configuration diagram showing a function performed by a processor of FIG. 1.

As shown in FIG. 3, the processor 13 includes a waypoint registration unit 131, an arrangement generation unit 132, an arrangement evaluation unit 133, an arrangement extraction unit 134, a path determination unit 135, a path generation unit 136, an arrangement exclusion unit 137, and an arrangement evaluation update unit 138. The processes executed by these units are described with reference to a flowchart shown in FIG. 4.

Figure 4:
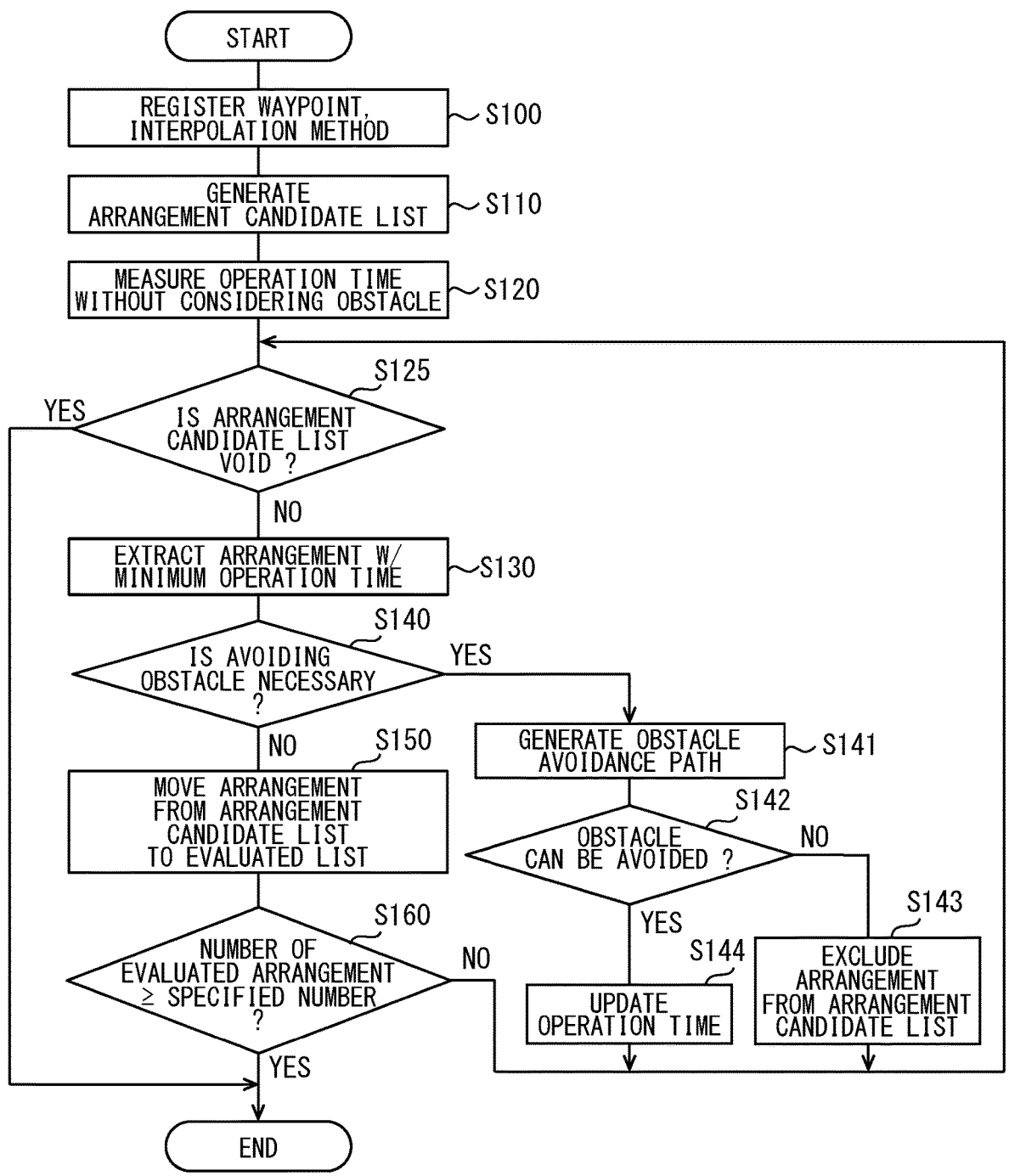
FIG. 4 is a flowchart showing a process executed by the processor.

The flowchart shown in FIG. 4 is started by a start operation of a user who uses the layout generation device 1. By executing the flowchart (i.e., flowcharted algorithm) shown in FIG. 4, it is possible to generate a layout for the robot 2 and surrounding obstacle(s) in a joint space.

The joint space is a coordinate space defined by the dimension of the number of joints possessed by the robot 2. An angle of the first joint 24 can also be considered as an angle of the first shaft 21 with respect to the base 23. An angle of the second joint 25 can also be considered as an angle of the second joint 25 with respect to the first joint 24. Since the posture of the robot 2 can be expressed by an angle of the joint, the posture of the robot 2 is determined by determining the coordinates in the joint space.

The step (hereinafter, the step is omitted) S100 is a process executed by the waypoint registration unit 131. In S100, waypoints are registered, and an inter-waypoint sections interpolation method is registered. The inter-waypoint section is a path of the robot 2 between the waypoints. The user uses the input device 11 to register the waypoints and the interpolation method for the inter-waypoint sections. The registration may be configured to be temporarily stored in the RAM 15, for example. In S100, a plurality of positions and/or postures that the robot 2 must pass through are registered as waypoints. In S100, an interpolation method is registered as to how the robot operates in the inter-waypoint section. The interpolation method includes a method of calculating a position, a posture, and a joint angle of the robot 2 by linear interpolation. In S100 or before S100, the user may input the structure of the robot 2, the position of the obstacle 30, the operation path start point, the operation path end point, and the like by using the input device 11.

In S110, which is a process executed by the arrangement generation unit 132, an arrangement candidate list is generated. Generating an arrangement candidate list includes generating the positions and postures of the robot 2 at regular intervals. The arrangement candidate list includes randomly generating the position and posture of the robot 2, for example, randomly creating the position and the posture within a range set by using a particle swarm optimization (PSO) method. The particle swarm optimization method includes a method of searching while sharing information on the best-of-the-group individual position with an entire group. In S110, a plurality of discrete arrangements of the robot 2 are automatically generated so that the waypoints registered in S100 are within an operation range of the robot 2. More specifically, an arrangement may be generated in S110 at a specific interval within a certain range set as in a grid search, or an arrangement is generated by using the particle swarm optimization method as described above.

In S120, which is a process executed by the arrangement evaluation unit 133, the operation time of the robot 2 without considering the obstacle 30 is measured. In S120, a minimum operation time of the robot 2 is measured for the arrangement candidate list generated in S110 without considering obstacles. In S120, the minimum operation time is measured by using the registered waypoints as they are, that is, without adding waypoints for avoiding obstacles. Further, in S120, the measured operation time is registered as an evaluation value of a relevant arrangement. The registration of the evaluation value may be configured to be temporarily stored in the RAM 15, for example.

In S125, the process may be ended upon determining that the arrangement candidate list is void. For example, if S125=YES, then END. Alternatively, other steps (not shown) may be used to prevent endless loops. For example, if every path (arrangement candidate) has an obstacle that cannot be avoided (S142=NO), then every path is excluded (S143). In this case, it appears that there is NO remaining path (arrangement candidate) on the arrangement candidate list when step S130 attempts to extract an arrangement with a minimum operation time from the arrangement candidate list. Thus, the process may be ended upon a determination that every path has an obstacle that cannot be avoided (not shown).

Similarly, as a second example, it appears that an endless loop may also occur if S160 is never satisfied. S160 is never satisfied if the condition "NUMBER OF EVALUATED ARRANGEMENT SPECIFIED NUMBER" is never satisfied. Thus, another condition (not shown) may prevent this endless loop.

In S130, which is a process executed by the arrangement extraction unit 134, the arrangement having the minimum operation time is extracted from the arrangement candidate list. S130 is a process of extracting an arrangement that has the minimum operation time when it is assumed that there is no obstacle.

In S140, which is a process executed by the path determination unit 135, it is determined whether or not it is necessary to avoid obstacles for the minimum operation time arrangement. In S140, it is, in other words, determined whether or not there is an inter-waypoint section that interferes with an obstacle with respect to a path related to the arrangement extracted in S130. S140 is also a step of executing an interference determination between the robot 2 and the obstacle 30. When there is no inter-waypoint section that requires obstacle avoidance, such an arrangement is set as one of the best arrangements, and the process proceeds to S150. When there is an inter-waypoint section that requires obstacle avoidance, the process proceeds to S141.

In S141, which is a process executed by the path generation unit 136, an obstacle avoidance path for avoiding obstacles is automatically generated for the inter-waypoint section where obstacle avoidance is required. In S141, the operation of the robot 2 for avoiding obstacles is automatically generated for one section or a plurality of sections where obstacle avoidance is required. S141 is, for example, a process in which a position and/or posture of the robot 2 automatically generated in order to avoid an obstacle is added as a waypoint to an arrangement regarding which the determination process is performed in S142.

Next, in S142, it is determined whether or not the obstacle can be avoided with respect to the obstacle avoidance path generated by adding a waypoint in S141. When it is determined in S142 that the obstacle cannot be avoided, the process proceeds to S143. In S142, when an obstacle interferes at/with the added waypoint, or when a path for avoiding the obstacle cannot be generated in S141, the process proceeds to S143. When it is determined in S142 that the obstacle can be avoided, the process proceeds to S144.

In S143, which is a process executed by the arrangement exclusion unit 137, when it is determined in S142 that the obstacle cannot be avoided, or when an obstacle avoidance path cannot be generated in S141, such an arrangement is excluded from the arrangement candidate list to be used in S130. Then, the process proceeds, i.e., returns, to S130, and another arrangement having the minimum operation time is extracted from the post-exclusion arrangement candidate list (in other words, extracted from the updated or reduced arrangement candidate list). By the processing of S130 after executing S143 in the above-described manner, it becomes possible to search for an arrangement in which the operation time of the robot 2 is short, after excluding an arrangement in which obstacle avoidance is impossible.

In S144, which is a process executed by the arrangement evaluation update unit 138, the operation time is measured for the arrangement including the obstacle avoidance path to which the waypoint is added in S141. The measured operation time is updated as an evaluation value of the arrangement including the path added in S141, and then the process of S130 is executed using the arrangement candidate list reflecting the updated evaluation value. The update of the evaluation value may be, for example, configured to be registered to the RAM 15.

In S150, a process of moving the arrangement determined in S140 that avoidance of obstacles is unnecessary from the arrangement candidate list to an evaluated list is performed. The evaluated list may be registered to the RAM 15, for example.

In S160, it is determined whether or not the number of evaluated arrangements is equal to or greater than a specified number. The specified number may be a predetermined number or a value input and set by the user using the input device 11. When it is determined in S160 that the number of evaluated arrangements is equal to or greater than the specified number, the flowchart ends. The evaluated arrangement is displayed on the display device 12 as a layout regarding which the robot operation time is short.

When it is determined that the number of arrangements evaluated in S160 is less than the specified number, the process proceeds, i.e., returns, to S130. The processing after S130 is repeated until it is determined in S160 that the number of evaluated arrangements has reached the specified number or more. The layout generated as described above is displayed on the display device 12.

The operational effects brought about by the layout generation device 1 of the first embodiment are described. The layout generation device 1 generates a layout having the best evaluation value with respect to the arrangement including the robot 2 and the obstacle 30. The layout generation device 1 includes a waypoint registration unit 131, an arrangement generation unit 132, an arrangement evaluation unit 133, an arrangement extraction unit 134, a path determination unit 135, a path generation unit 136, and an arrangement evaluation update unit 138.

The waypoint registration unit 131 executes a process of registering (i) a waypoint that the robot 2 needs to pass through and (ii) a method of interpolating an inter-waypoint section. The arrangement generation unit 132 executes a process of generating a plurality of arrangements including the robot 2 and the obstacle 30. The arrangement evaluation unit 133 executes a process of evaluating the operation time of the robot 2 without considering the obstacle 30 as an evaluation value for each arrangement. The arrangement extraction unit 134 executes a process of extracting an arrangement having the best evaluation value from the arrangements evaluated by the arrangement evaluation unit 133. The path determination unit 135 determines whether or not the operation of the robot 2 passing through the waypoint needs to avoid the obstacle 30 for the arrangement extracted by the arrangement extraction unit 134.

When it is determined that the obstacle 30 needs to be avoided, the path generation unit 136 executes a process of generating an obstacle avoidance path that can avoid the obstacle 30. The arrangement evaluation update unit 138 evaluates and updates the operation time of the robot 2 related to the operation path having an addition of the obstacle avoidance path generated by the path generation unit 136 as the evaluation value of the arrangement. The layout generation device 1 repeats the extraction of arrangements by the arrangement extraction unit 134 until a specified number or more of arrangements that do not require avoidance of obstacles are obtained based on the determination of the path determination unit 135.

According to such a configuration, the time required for the evaluation of the operation time is reducible by evaluating the operation time without considering the obstacle for (i.e., regarding) a plurality of arrangements, which is executed by the arrangement evaluation unit 133. Further, the layout generation device 1 repeats extraction of the best evaluation arrangement, determination of necessity of obstacle avoidance, and generation of obstacle avoidance path until the number of arrangements that do not require obstacle avoidance becomes a specified number or more. By such processing, the layout generation device 1 can reduce the processing required for the evaluation of the operation time and the processing for determining the necessity of avoiding obstacles, thereby improving efficiency. Therefore, it is possible to provide the layout generation device 1 that enables efficient arrangement search with a short robot operation time.

When the path generation unit 136 cannot generate an obstacle avoidance path, the arrangement exclusion unit 137 excludes, from the arrangement candidate list which is a target of extraction for the arrangement extraction unit 134 to extract an arrangement candidate. According to such a configuration, the arrangement extraction unit 134 can perform a process of (i) canceling the arrangement that has been evaluated as best once (i.e., in the past) and (ii) urging an extraction of an arrangement having the best evaluation from among the remaining arrangement candidates.

The disclosed layout generation method is executed by the processor 13 to generate a layout having the best evaluation value for the arrangement including the robot 2 and the obstacle 30. In the layout generation, a waypoint required to be passed by the robot and an interpolation method for interpolating an inter-waypoint section are registered (S100), and a plurality of arrangements including the robot and an obstacle are generated (S110). In the layout generation method, the operation time of the robot without considering the obstacle is evaluated as an evaluation value for each of the arrangements (S120), and the arrangement with the best evaluation value is extracted from among the evaluated arrangements (S130). In S125, the process may be ended upon determining that the arrangement candidate list is void. For example, if S125=YES, then END. In another embodiment, waypoints are registered, and an interpolation method is not registered. The layout generation method determines whether or not the operation of the robot via the waypoint regarding the extracted arrangement needs to avoid the obstacle (S140), and, upon determining that it is necessary to avoid the obstacle, generates an obstacle avoidance path that can avoid the obstacle (S141). The layout generation method evaluates and updates the operation time of the robot related to the operation path to which the obstacle avoidance path has been added as an evaluation value of the arrangement (S144). The layout generation method repeats the extraction of the arrangement having the best evaluation value from the evaluated arrangements until a specified number or more of the arrangements that do not require avoidance of the obstacle are obtained. In another embodiment, arrangements that can successfully avoid obstacles are receive updated operation times (S144), and are considered as not needing to avoid (new) obstacles (S140=NO). In another embodiment, due to needing to determine whether the same interpolation method is acceptable for all case, the method registers an interpolation method to each of the waypoints (which may be a different method for each of the waypoints), or registers the same method to all of the waypoints.

The layout generation program is executed by the processor 13. The layout generation program operates the layout generation device that generates a layout having the best evaluation value for an arrangement including the robot 2 and the obstacle 30. The layout generation program is configured such that a processor executes the layout generation method described above.

Figure 6:
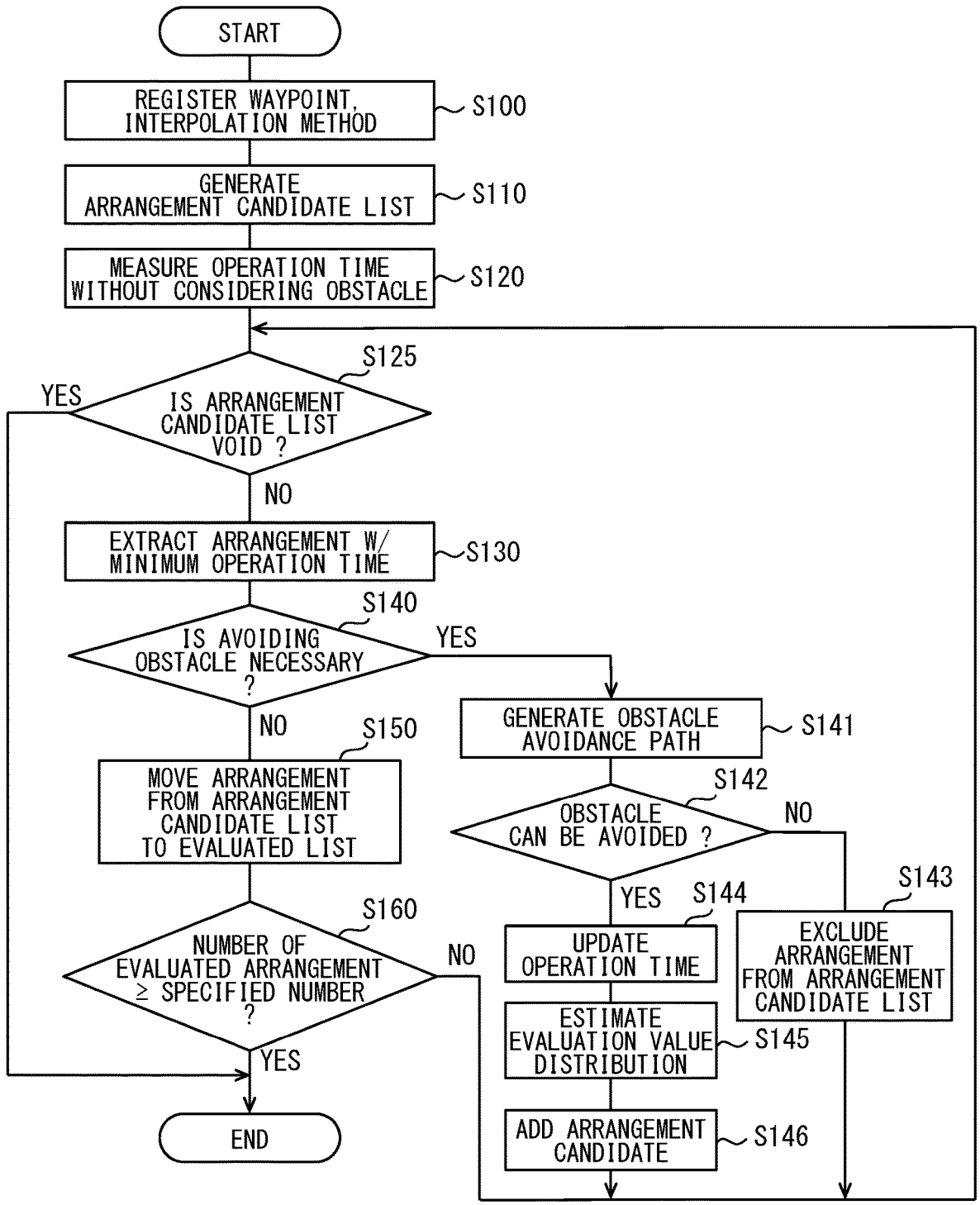
FIG. 6 is a flowchart showing a process executed by the processor.

Second Embodiment, FIG. 6, Add Arrangement Candidates

Figure 5:
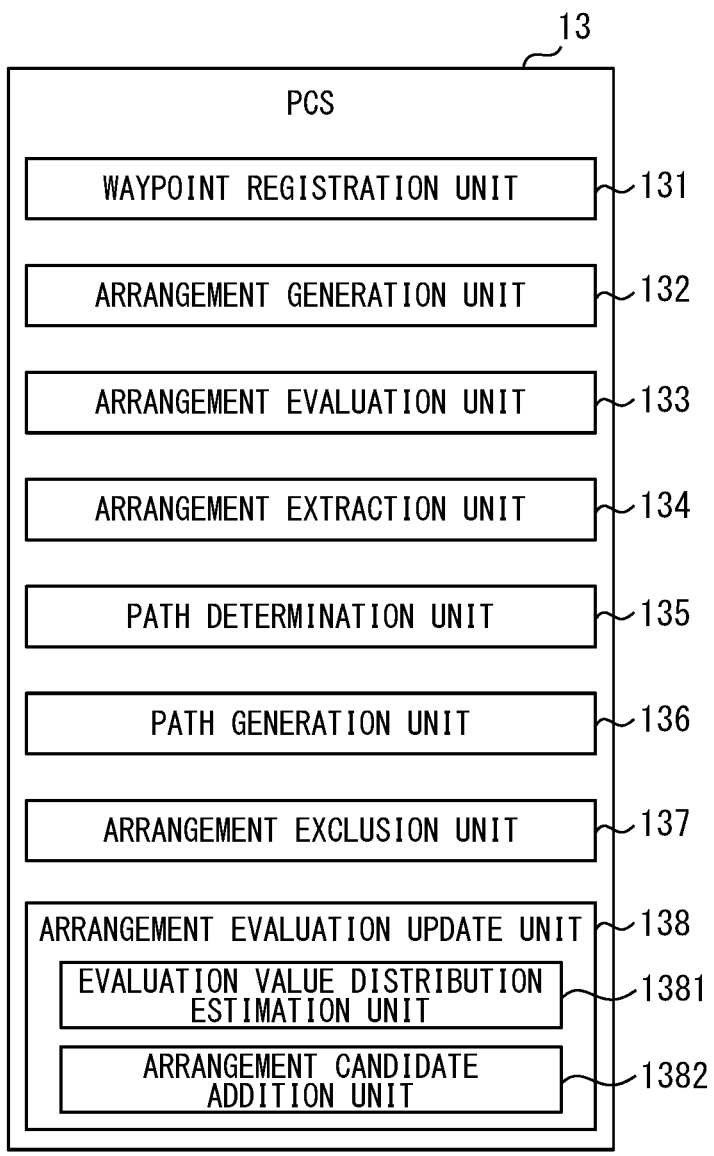
FIG. 5 is a configuration diagram of the function performed by the processor of a second embodiment.

The second embodiment is described with reference to FIGS. 5 and 6. The layout generation device of the second embodiment is described with reference to FIGS. 5 and 6. The steps, configurations, operations, and effects that are not particularly described in the second embodiment are the same as those in the first embodiment, and only the difference from those in the first embodiment is described below.

The layout generation device of the second embodiment is different from that of the first embodiment in that it includes an evaluation value distribution estimation unit 1381 and an arrangement candidate addition unit 1382. The evaluation value distribution estimation unit 1381 and the arrangement candidate addition unit 1382 may be included in the arrangement evaluation update unit 138. A flowchart shown in FIG. 6 includes S145 executed by the evaluation value distribution estimation unit 1381 and S146 executed by the arrangement candidate addition unit 1382. In S100 to S144, S150, and S160 in the flowchart shown in FIG. 6, the same processing as the steps having the same reference numerals shown in FIG. 4 is performed.

In S145, which is a process executed by the evaluation value distribution estimation unit 1381, an evaluation value distribution related to the arrangement candidate list generated in S110 is estimated. The estimation of the evaluation value distribution is performed using a predetermined index. The evaluation value distribution of the arrangement candidate list is, for example, a distribution of the arrangement candidate list in which the position and the operation time are distributed (i.e., plotted) on coordinate planes set on a horizontal axis and a vertical axis. The position on the horizontal axis is (represented by) a position coordinate for searching for one axis among, for example, X, Y, Z, Rx, Ry, and Rz.

In S146, which is a process executed by the arrangement candidate addition unit 1382, one or a plurality of new arrangements are added to an evaluation value distribution generated in S145. In S146, an arrangement is added to the evaluation value distribution generated in S145, i.e., to a position around an arrangement that corresponds to the minimum value of the operation time. In S146, a new arrangement in which the operation time has a minimum value is added to the evaluation value distribution generated in S145.

Further, after performing S146, the processing of S130 is executed using the arrangement candidate list reflecting the new arrangement added in S146. The processing of S146 is an update process of the arrangement candidate list and is also an update process of the evaluation value. The arrangement candidate list may be configured to be updated, for example, in the RAM 15.

According to the second embodiment, the evaluation value distribution estimation unit 1381 estimates the evaluation value distribution using a predetermined index for the plurality of arrangements generated by the arrangement generation unit 132. The arrangement candidate addition unit 1382 adds one or more new arrangements to the evaluation value distribution estimated by the evaluation value distribution estimation unit 1381 as arrangement candidates to be extracted by the arrangement extraction unit 134. According to such a configuration, by adding the arrangement candidates using the estimated evaluation value distribution, it is possible to efficiently search for the arrangement with a better evaluation value than the arrangement candidate(s) given in advance.

The arrangement candidate addition unit 1382 adds a new arrangement corresponding to the minimum operation time to the evaluation value distribution estimated by the evaluation value distribution estimation unit 1381 as an arrangement candidate. The arrangement candidate addition unit 1382 adds, to the evaluation value distribution as an arrangement candidate, a new arrangement having a position around an arrangement whose operation time is the minimum value (i.e., the minimum operation time). According to such a configuration, by adding an arrangement candidate to a position around the distribution having a high possibility of good evaluation value, it is possible to reduce unnecessary arrangement candidates and efficiently generate arrangement candidates for the evaluation. Therefore, these processes contribute to the extraction of arrangements having a short operation time to be performed in a short duration of time.

Figure 7:
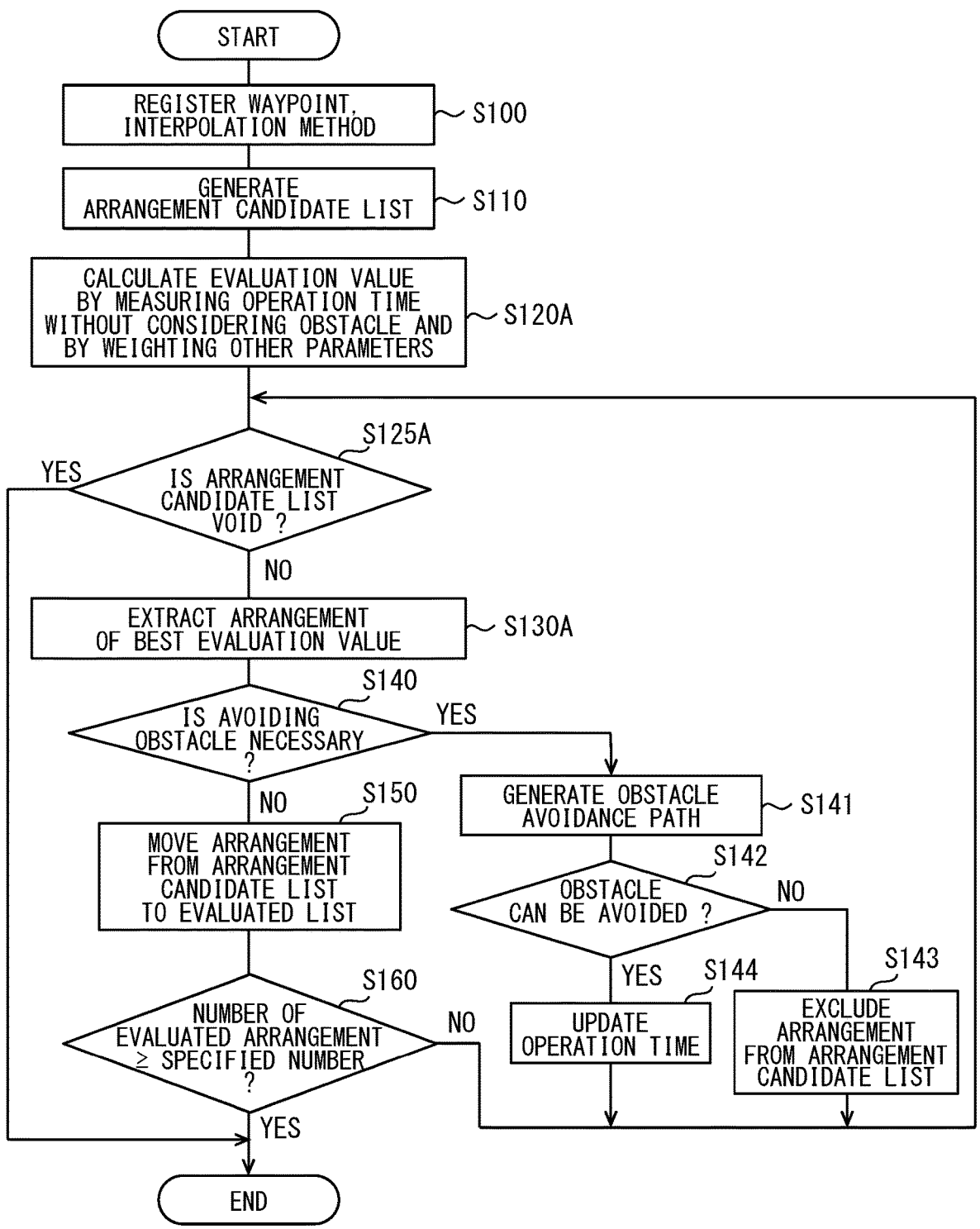
FIG. 7 is a flowchart showing a process executed by the processor of a third embodiment.

Third Embodiment, FIG. 7, Other Parameters for Evaluation Value

The third embodiment is described with reference to FIG. 7. The layout generation device of the third embodiment is described with reference to FIG. 7. The steps, configurations, actions, and effects that are not particularly described in the third embodiment are the same as those in the first embodiment, and only the points different from those in the first embodiment are described below.

The layout generation device of the third embodiment is different from the first embodiment in that it includes a step of calculating a weighted evaluation value for the arrangement candidates. The flowchart shown in FIG. 7 includes S120A and S130A. Among the steps in the flowchart shown in FIG. 7, the steps having the same reference numerals as those in FIG. 4 correspond to the same processing as in the first embodiment.

In S120A, for each of the arrangement candidates generated in S110, a sum of the evaluation value according to the operation time without considering the obstacle and the evaluation values obtained by weighting other parameters is calculated. Other parameters include, for example, the operability (or movability) of a waypoint, the minimum distance between a surrounding member such as an obstacle and the robot 2, the distance from the movable (sweep) range of the joint angle of the robot 2, and the like. The operability of the waypoint is an index that quantitatively indicates the operation capability of the robot 2 when passing through the waypoint. The distance from the movable range of the joint angle of the robot 2 is a distance from the movable range of the joint limited by software so as not to move any further.

In S120A, the sum of the evaluation values weighted for at least one of these other parameters and the evaluation value according to the operation time without considering the obstacle is calculated. Also, in S120A, the sum of the evaluation values weighted for all of these other parameters and the evaluation value according to the operation time without considering the obstacle may be calculated. As a result, it is possible to carry out a multifaceted evaluation in which not only the operation time but also a plurality of parameters related to the operation of the robot 2 are taken into consideration.

S120A is a process of calculating an evaluation value obtained by scoring a plurality of parameters related to the operation of the robot 2 in addition to the evaluation value related to the operation time of the robot 2 without considering the obstacle. For example, the operation time is evaluated by weighting a positive value, and the other parameters are evaluated by weighting a negative value. In such manner, an evaluation that emphasizes other parameters that weight negative values is made possible. In S125A, the process may be ended upon determining that the arrangement candidate list is void. For example, if S125A=YES, then END.

The sum of the evaluation values calculated in S120A as described above is compared in S130A and used in the process of extracting, as the best arrangement, the arrangement that has the minimum evaluation value.

Then, in S140, which is a process executed by the path determination unit 135, it is determined whether or not it is necessary to avoid the obstacle for the arrangement which is extracted as the best evaluation value in S130A.

According to the third embodiment, layout generation that reflects various evaluation viewpoints can be performed by multifaceted evaluation that takes into account not only the operation time but also the parameters related to the operation of the robot 2.

Figure 8:
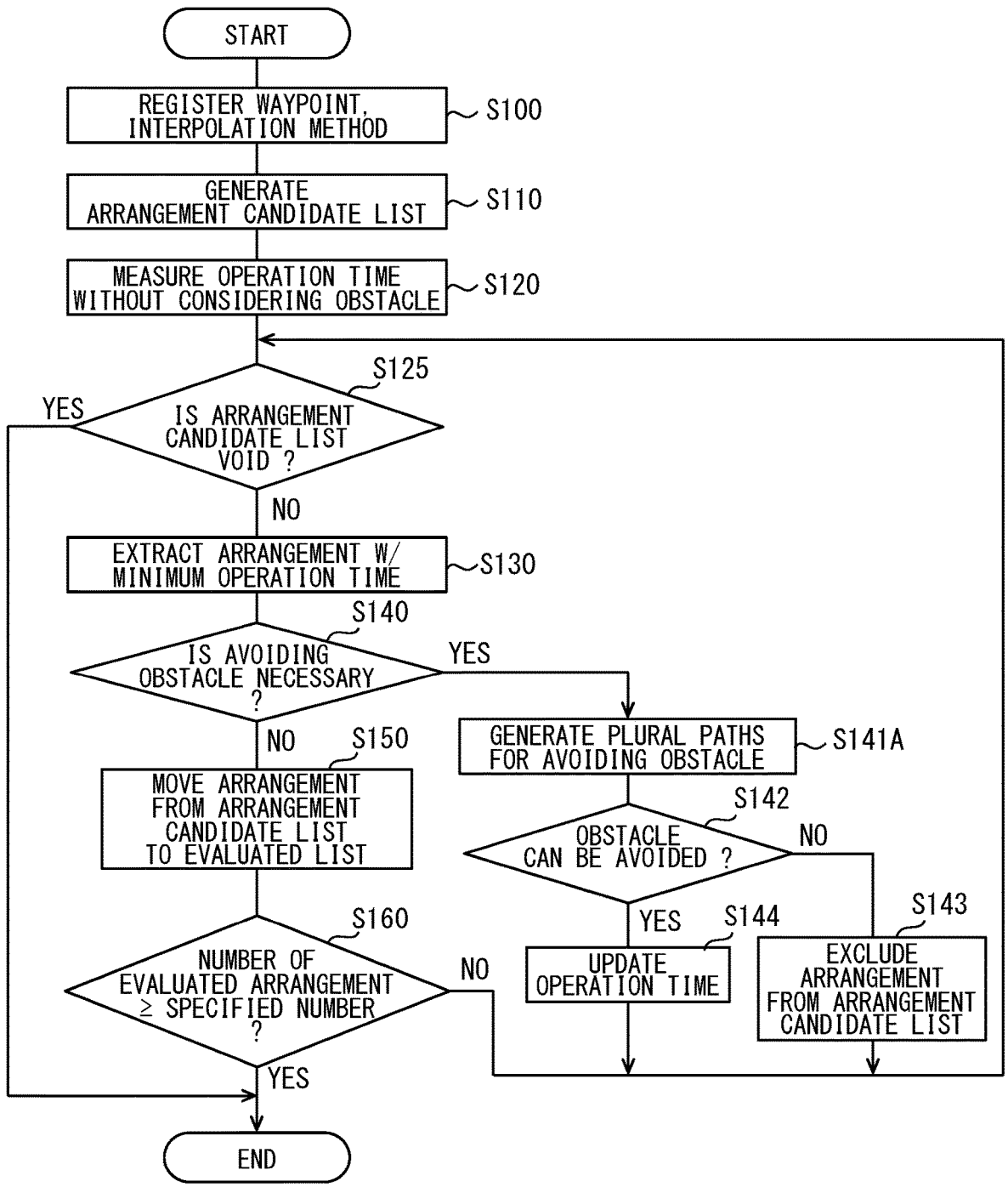
FIG. 8 is a flowchart showing a process executed by the processor of a fourth embodiment.

Fourth Embodiment, FIG. 8, Plural Paths for Avoiding Obstacle

The fourth embodiment is described with reference to FIG. 8. The layout generation device of the fourth embodiment is described with reference to FIG. 8. The steps, configurations, actions, and effects that are not particularly described in the fourth embodiment are the same as those in the first embodiment, and only the points different from those in the first embodiment are described below.

The layout generation device of the fourth embodiment is different from the first embodiment in that it includes S141A, which is a process executed by the path generation unit 136. Among the steps in the flowchart shown in FIG. 8, the steps having the same reference numerals as those in FIG. 4 correspond to the same processing as in the first embodiment.

In S141A, a path that can avoid the obstacle is automatically generated a plurality of times for the inter-waypoint section that needs to avoid the obstacle, and the path having the minimum operation time is determined from among the generated paths. S141A includes a process of generating a plurality of paths automatically generated in S141 of the first embodiment. Next, in S142, it is determined whether or not the obstacle can be avoided for the paths determined in S141A.

According to the fourth embodiment, for example, when a path is generated by a random search such as an RRT (Rapidly-exploring Random Tree) algorithm, it is possible to suppress the variation of the path, which contributes to improving the accuracy of the path generation. Therefore, the layout generation device can provide an arrangement candidate with a better evaluation value by selecting the best path obtained from a plurality of times of path generation.

Figure 9:
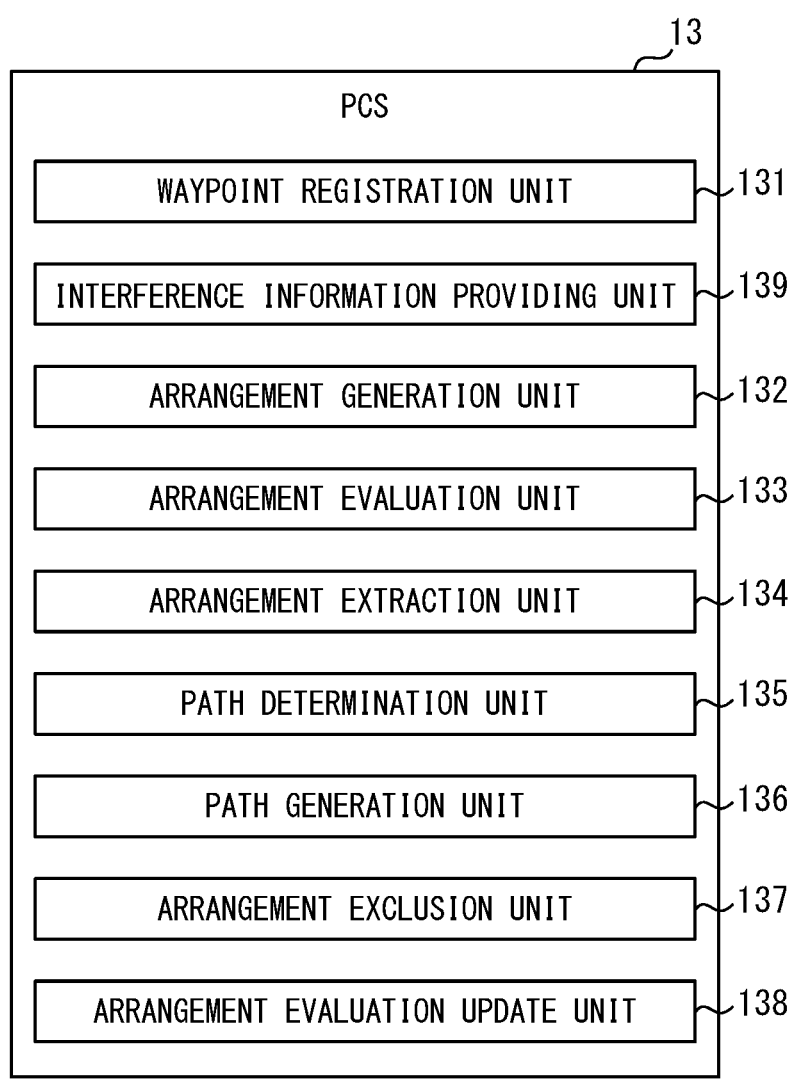
FIG. 9 is a configuration diagram showing a function executed by the processor of a fifth embodiment.
Figure 10:
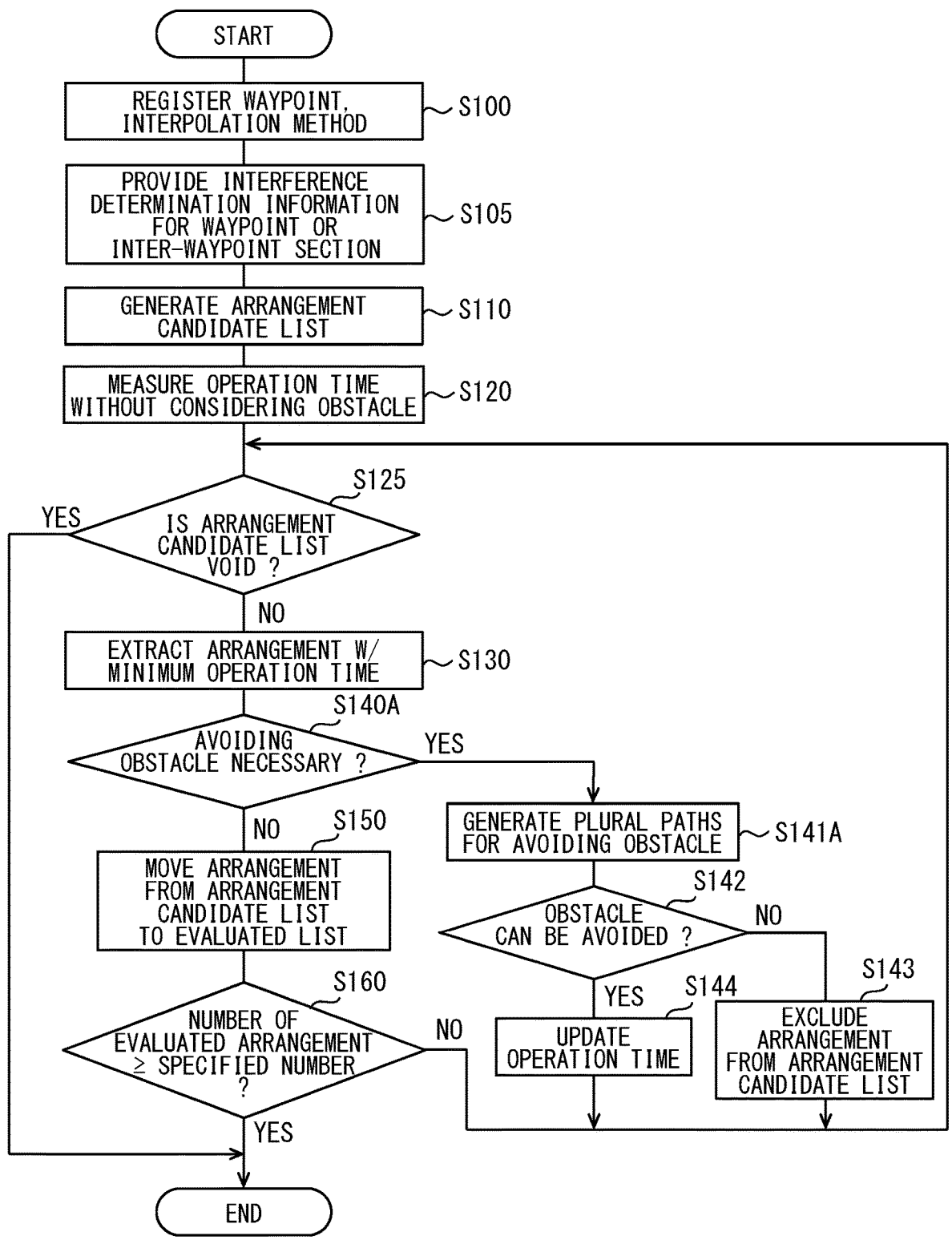
FIG. 10 is a flowchart showing a process executed by the processor.

Fifth Embodiment, FIGS. 9 and 10, Interference Information

The fifth embodiment is described with reference to FIGS. 9 and 10. That is, the layout generation device of the fifth embodiment is described with reference to FIGS. 9 and 10. The steps, configurations, actions, and effects that are not particularly described in the fifth embodiment are the same as those in the first embodiment, and only the points different from those in the first embodiment are described below.

The layout generation device of the fifth embodiment is different from the first embodiment in that it includes an interference information providing unit 139. The flowchart shown in FIG. 10 includes S105 executed by the interference information providing unit 139. Among the steps in the flowchart shown in FIG. 10, the steps having the same reference numerals as those in FIG. 4 correspond to the same processing as in the first embodiment.

In S105, which is a process executed by the interference information providing unit 139, interference determination information is given to or provided for the operation at the waypoint or in the inter-waypoint section. The interference determination information is information used in the determination process in S140A. The interference determination information is also reflected in the path generation process in S141A. In S140A, which is a process executed by the path determination unit 135, it is determined whether or not it is necessary to avoid the obstacle for the minimum arrangement by using the interference determination information provided in S105. In S141A, an obstacle avoidance path for avoiding an obstacle is automatically generated for an inter-waypoint section that needs obstacle avoidance by the determination made by using the interference determination information in S140A.

In S105, information regarding the combination of the 3D models relating to the robot 2 and the obstacle 30 is provided to the operation of the robot 2 at or around the waypoint or the inter-waypoint section, which is used to determine the presence or absence of interference with the obstacle. Information about the 3D model is stored in, for example, the ROM 14. The information about the 3D model may be set by the user operating the input device 11, or may be automatically selected from a plurality of pieces of information. The interference determination information is classified into a paired sequence such as a 3D model name and ID, a group name and ID set in advance for each combination of 3D models, and the like, and is stored/memorized in the ROM 14 or the like.

The addition of the interference determination information as described above contributes to the generation of a path suitable for an environment that changes depending on the operation of the robot at the waypoint or in the inter-waypoint section.

OTHER EMBODIMENTS

The present disclosure is not limited to the embodiments shown above as examples. The present disclosure encompasses the illustrated embodiments and variations thereof by those skilled in the art. For example, the present disclosure is not limited to the combinations of components and elements shown in the embodiments, and various modifications and implementations can be performed. The present disclosure may be implemented in various combinations. The present disclosure may have additional portions that can be added to the embodiments. The present disclosure encompasses the omission of components and elements of the embodiments. The present disclosure encompasses the rearrangement or combination of components, elements between one embodiment and the other. The disclosed technical scope is not limited to the description of the embodiment. It should be understood that the disclosed technical scope is defined in claims and includes meanings equivalent to the claims and all modifications of the scope of the claims.

S110 of the above-described embodiment may be a process including extracting in advance an arrangement candidate in which the robot 2 and the obstacle 30 do not interfere with each other.

The device and method thereof described in the present disclosure may be realized by a dedicated computer constituting a processor programmed to perform one or more functions embodied by a computer program. Alternatively, the device and the method described in the present disclosure may be realized by a dedicated hardware logic circuit. Alternatively, the device and the method described in the present disclosure may be realized by one or more dedicated computers configured by a combination of a processor that executes a computer program and one or more hardware logic circuits. The computer programs may be stored, as instructions to be executed by a computer, in a tangible, non-transitory computer-readable storage medium.

The control device, the signal source, and the control object provide various elements. At least some of these elements may be referred to as blocks, modules, or sections. Furthermore, only in a case intended, such elements included in the control system may be referred to as means for performing the functions thereof.

What is claimed is:

1. A layout generation device that generates a layout having a best evaluation value for an arrangement including a robot and an obstacle, the layout generation device comprising:
    a waypoint registration unit configured to register (i) a waypoint that the robot needs to pass through and (ii) an interpolation method for interpolating an inter-waypoint section between two waypoints;
    an arrangement generation unit configured to generate arrangements, within a set range, including the robot and the obstacle, and generate an arrangement candidate list including the arrangements;
    an arrangement evaluation unit configured to evaluate an operation time of the robot without considering the obstacle for each of the arrangements in the arrangement candidate list as a respective evaluation value;
    an arrangement extraction unit configured to
        extract an arrangement having a best evaluation value from the arrangement candidate list;
    a path determination unit configured to determine whether or not the operation of the robot via the waypoint needs to avoid the obstacle regarding the arrangement in an arrangement list extracted by the arrangement extraction unit;
    a path generation unit configured to generate an obstacle avoidance path for one section or a plurality of sections where obstacle avoidance is required, the obstacle avoidance path enabling to avoid the obstacle when the path determination unit determines that it is necessary to avoid the obstacle; and
    an arrangement evaluation update unit configured to evaluate and update the operation time of the robot related to the obstacle avoidance path generated by the path generation unit as an evaluation value of the arrangement, wherein
    the arrangement extraction unit configured to
        extract again the arrangement having the best evaluation value using the arrangement candidate list reflecting the updated evaluation value,
    the path determination unit configured to determine whether or not the operation of the robot via the waypoint needs to avoid the obstacle regarding the arrangement having the best evaluation value, and
    the arrangement extraction unit configured to repeat extraction of the arrangements until a specified number or more of the arrangements that do not require avoidance of the obstacle are obtained.

2. The layout generation device of claim 1 further comprising:
    an evaluation value distribution estimation unit that estimates an evaluation value distribution using a predetermined index for arrangements generated by the arrangement generation unit; and
    an arrangement candidate addition unit that adds one or more new arrangements to the evaluation value distribution estimated by the evaluation value distribution estimation unit as arrangement candidates to be extracted by the arrangement extraction unit.

3. The layout generation device of claim 2, wherein
    the arrangement candidate addition unit adds, to the evaluation value distribution estimated by the evaluation value distribution estimation unit as an arrangement candidate, a new arrangement having a position associated with an arrangement whose operation time is a minimum operation time.

4. The layout generation device of claim 1, wherein
    the arrangement evaluation unit calculates a sum of (i) the evaluation value from an evaluation of the operation time of the robot without considering the obstacle and (ii) evaluation values weighted for at least one of (a) an operability of the waypoint, (b) a minimum distance between the obstacle and the robot, and (c) a distance from a movable range of a joint angle of the robot, and
    the arrangement extraction unit extracts an arrangement in which the sum of the evaluation values is a minimum from the arrangements evaluated by the arrangement evaluation unit.

5. The layout generation device of claim 1, wherein
the path generation unit, by executing path generation of the obstacle avoidance path a plurality of times, determines a path having a minimum operation time of the robot from among the obstacle avoidance paths, and
the arrangement evaluation update unit evaluates and updates, as an evaluation value of the arrangement, the operation time of the robot related to the operation path to which the path having the minimum operation time has been added.

6. The layout generation device of claim 1, further comprising:
an interference information providing unit providing interference determination information regarding a combination of 3D models related to the robot and the obstacle, for use by the path determination unit when determining whether or not the obstacle interferes with the operation at the waypoint or in the inter-waypoint section.

7. The layout generation device of claim 1, further comprising:
an arrangement exclusion unit excluding an arrangement that is determined by the path determination unit as needing an obstacle avoidance from arrangement candidates to be extracted by the arrangement extraction unit when the obstacle avoidance path cannot be generated by the path generation unit.

8. A layout generation method that is executed by at least one processor and generates a layout with a best evaluation value for an arrangement including a robot and an obstacle, wherein the method comprises:
registering: (i) a waypoint that the robot needs to pass through or (ii) an interpolation method for interpolating an inter-waypoint section between two waypoints;
generating arrangements including the robot and the obstacle, within a set range;
generating an arrangement candidate list including the arrangements;
evaluating an operation time of the robot that does not consider the obstacle for each of the arrangements in the arrangement candidate list, as a respective evaluation value;
extracting an arrangement with a best evaluation value from among the evaluated arrangements in the arrangement candidate list;
determining whether or not it is necessary for a robot operation via the waypoint to avoid the obstacle regarding the extracted arrangements in an arrangement list;
generating, when determining that it is necessary to avoid the obstacle, an obstacle avoidance path for one section or a plurality of sections where obstacle avoidance is required, the obstacle avoidance path enabling to avoid the obstacle; and
evaluating and updating the operation time of the robot to include the obstacle avoidance path as the evaluation value of a relevant arrangement, wherein
the layout generation method
extracts again the arrangement having the best evaluation value using the arrangement candidate list reflecting the updated evaluation value,
determines whether or not the operation of the robot via the waypoint needs to avoid the obstacle regarding the arrangement having the best evaluation value, and
repeats extraction until a specified number or more of arrangements that do not require avoidance of the obstacle are obtained.

9. A non-transitory computer readable storage medium storing a layout generation program for generating a layout having a best evaluation value for an arrangement including a robot and an obstacle, in which the program includes:
registering: (i) a waypoint that the robot needs to pass through and (ii) an interpolation method for interpolating an inter-waypoint section between two waypoints;
generating arrangements including the robot and the obstacle, within a set range;
generating an arrangement candidate list including the arrangements;
evaluating an operation time of the robot that does not consider the obstacle for each of the arrangements in the arrangement candidate list, as a respective evaluation value;
extracting an arrangement with a best evaluation value from among the evaluated arrangements in the arrangement candidate list;
determining whether or not it is necessary for a robot operation via the waypoint to avoid the obstacle regarding the extracted arrangement in an arrangement list;
generating, when determining that it is necessary to avoid the obstacle, an obstacle avoidance path for one section or a plurality of sections where obstacle avoidance is required, the obstacle avoidance path enabling to avoid the obstacle; and
evaluating and updating the operation time of the robot to include the obstacle avoidance path as the evaluation value of a relevant arrangement, wherein
the program
extracts again the arrangement having the best evaluation value using the arrangement candidate list reflecting the updated evaluation value,
determines whether or not the operation of the robot via the waypoint needs to avoid the obstacle regarding the arrangement having the best evaluation value, and
repeats extraction until a specified number or more of arrangements that do not require avoidance of the obstacle are obtained.

10. A layout generation device that generates a layout having a best evaluation value for an arrangement including a robot and an obstacle, the layout generation device comprising:
a waypoint registration unit configured to register (i) a waypoint that the robot needs to pass through and (ii) an interpolation method for interpolating an inter-waypoint section between two waypoints;
an arrangement generation unit configured to
generate arrangements, within a set range, including the robot and the obstacle, and
generate an arrangement candidate list including the arrangements;
an arrangement evaluation unit configured to evaluate an operation time of the robot without considering the obstacle for each of the arrangements in the arrangement candidate list as a respective evaluation value;
an arrangement extraction unit configured to
extract an arrangement having a best evaluation value from the arrangement candidate list;
a path determination unit configured to determine whether or not the operation of the robot via the waypoint needs to avoid the obstacle regarding the arrangement in an arrangement list extracted by the arrangement extraction unit;

a path generation unit configured to generate, when the path determination unit determines that it is necessary to avoid the obstacle, an obstacle avoidance path, which enables to avoid the obstacle, for each of a plurality of sections where obstacle avoidance is required; and an arrangement evaluation update unit configured to evaluate and update the operation time of the robot related to the obstacle avoidance path generated by the path generation unit as an evaluation value of the arrangement, wherein the arrangement extraction unit configured to
  extract again the arrangement having the best evaluation value using the arrangement candidate list reflecting the updated evaluation value,
the path determination unit configured to determine whether or not the operation of the robot via the waypoint needs to avoid the obstacle regarding the arrangement having the best evaluation value, and
the arrangement extraction unit configured to repeat extraction of the arrangements until a specified number or more of the arrangements that do not require avoidance of the obstacle are obtained.

11. The layout generation device of claim 1, wherein the path generation unit generates the obstacle avoidance path for one section where the obstacle avoidance is required.

12. The layout generation method according to claim 8, wherein
the obstacle avoidance path is generated for one section where the obstacle avoidance is required.

13. The non-transitory computer readable storage medium according to claim 9, wherein
the obstacle avoidance path is generated for one section where the obstacle avoidance is required.

14. The layout generation method according to claim 8, wherein
the obstacle avoidance path is generated for each of the plurality of sections.

15. The non-transitory computer readable storage medium according to claim 9, wherein
the obstacle avoidance path is generated for each of the plurality of sections.

16. The layout generation device of claim 1, wherein
the arrangement generation unit generates the arrangements of the robot relative to the obstacle.

17. The layout generation device of claim 1, further comprising:
a generation unit generating a path for one section between the waypoint and the subsequent waypoint without considering the obstacle.

18. The layout generation device of claim 1, wherein
the arrangement having the best evaluation value is extracted from the arrangement list when it is assumed that there is no obstacle, and
when it is determined that the obstacle cannot be avoided, or when an obstacle avoidance path cannot be generated, such an arrangement is excluded from the arrangement list.

* * * * *